April 28, 1953 — E. H. SMITH — 2,636,276

CARBIDE LEVEL INDICATOR

Filed May 21, 1948 — 2 SHEETS—SHEET 1

INVENTOR.
ELMER H. SMITH
BY Paul, Paul & Moore
ATTORNEYS

April 28, 1953     E. H. SMITH     2,636,276
CARBIDE LEVEL INDICATOR

Filed May 21, 1948     2 SHEETS—SHEET 2

INVENTOR.
ELMER H. SMITH
BY
ATTORNEYS

Patented Apr. 28, 1953

2,636,276

UNITED STATES PATENT OFFICE 2,636,276

CARBIDE LEVEL INDICATOR

Elmer H. Smith, Minneapolis, Minn., assignor to Smith Welding Equipment Corporation, Minneapolis, Minn., a corporation of Minnesota Application May 21, 1948, Serial No. 28,400

3 Claims. (Cl. 33—126)

This invention relates to new and useful improvements in acetylene generators, generally, and more particularly to a device for indicating the level of the carbide in the hopper.

Most commercial acetylene generators, as now commonly constructed, are not equipped with means for visibly indicating the level of the carbide in the hopper, and the attendant therefore cannot always be certain as to just when the hopper may require recharging.

Attempts have heretofore been made to provide means for indicating the level of the carbide in the hopper of an acetylene generator, but to the best of my knowledge, none of these have proven entirely satisfactory. Most of these attempts have been directed to the provision of a window of some sort in a wall of the carbide hopper in the hope that the contents of the hopper might readily be noted therethrough. Unfortunately, carbide contains a certain amount of dust which has a tendency to readily adhere to smooth surfaces. Consequently, the inner surface of a window mounted in the wall of a carbide hopper quickly becomes coated with a layer of fine dust whereby the window may lose its transparency and, therefore, its usefulness as a means whereby the level of the carbide in the hopper may readily be noted.

The construction of most acetylene generators is such that to gain access to the interior of the hopper with a hand, it is usually necessary to detach the usual hood from the upper portion of the hopper in order that an attendant may insert his hand into the hopper to wipe off the inner surface of the window. To thus periodically open the hopper to permit wiping off the dust which may accumulate upon the inner surface of the hopper window may consume considerable time, and, therefore, is not looked upon as a satisfactory solution to the carbide level indicating problem.

To reduce the maintenance cost of operating one or more commercial carbide generators, and to assure efficient and continuous operation, it is highly desirable that some means be provided in combination with the usual hopper of a commercial type acetylene generator, whereby the level of the carbide contained in the hopper of each generator may readily be visibly noted from the exterior of the generator at all times, and which level indicating means be so constructed that it will require very little care on the part of the attendant to maintain it in efficient operation at all times.

An important object of the present invention, therefore, is to provide a carbide level indicating device or gauge which is so constructed that it may readily be embodied in the hopper of a carbide generator and will accurately visibly indicate the level of the carbide in the hopper at all times.

A further object is to provide an indicating device for acetylene generators comprising a member adapted to float upon the top of the carbide within the hopper, and which member has an operating connecting with an indicating device adapted to slowly pass before a window provided in a wall of the hopper, whereby an attendant may readily note the true level of the carbide within the hopper at all times.

A further object is to provide a level indicating device of the class described comprising a spiral shaft mounted in suitable bearings within the hopper in spaced parallel relation to the usual feed shaft provided therein, said spiral shaft or rod being angular in cross-section and engaged with a float member adapted to be supported on top of the carbide within the hopper, and which, by reason of its connection with the spiral gauge rod or shaft, causes said rod to rotate about its longitudinal axis as the gauge float gradually descends within the hopper, as the level of the carbide drops, said gauge rod having an arm secured thereto and laterally extending therefrom with its outer end positioned adjacent to the outer wall of the upper portion of the hopper whereby indicia carried by said arm may readily be noted through a window provided in the wall of the hopper.

A further object is to provide a level indicating device of the character disclosed comprising a window adapted to be removably mounted in a wall of the hopper whereby it may readily be detached from its mounting means to permit cleaning of the transparent panel or glass thereof, and also whereby the face of the indicator arm or member located within the hopper may readily be noted at will.

Other objects of the invention reside in the simple and inexpensive construction of the apparatus whereby it may be manufactured at low cost; in the provision of a "float" element made in the form of an annulus, comprising a lower cylindrical wall portion and an upper outwardly flared conical wall portion, and a hub being centrally supported in said annulus by a plurality of arms of comparatively small cross-section, and said hub having a guide opening therein for receiving the carbide feed shaft whereby the "float" is guided in its up and down movement by said shaft; and in the provision of a level indicating device comprising few parts, and all of said parts being extremely simple to manufacture and which, when embodied in the construction of a generator, provide a very accurate and efficient device for constantly indicating the level of the carbide within the hopper.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figures 1, 3, 4:
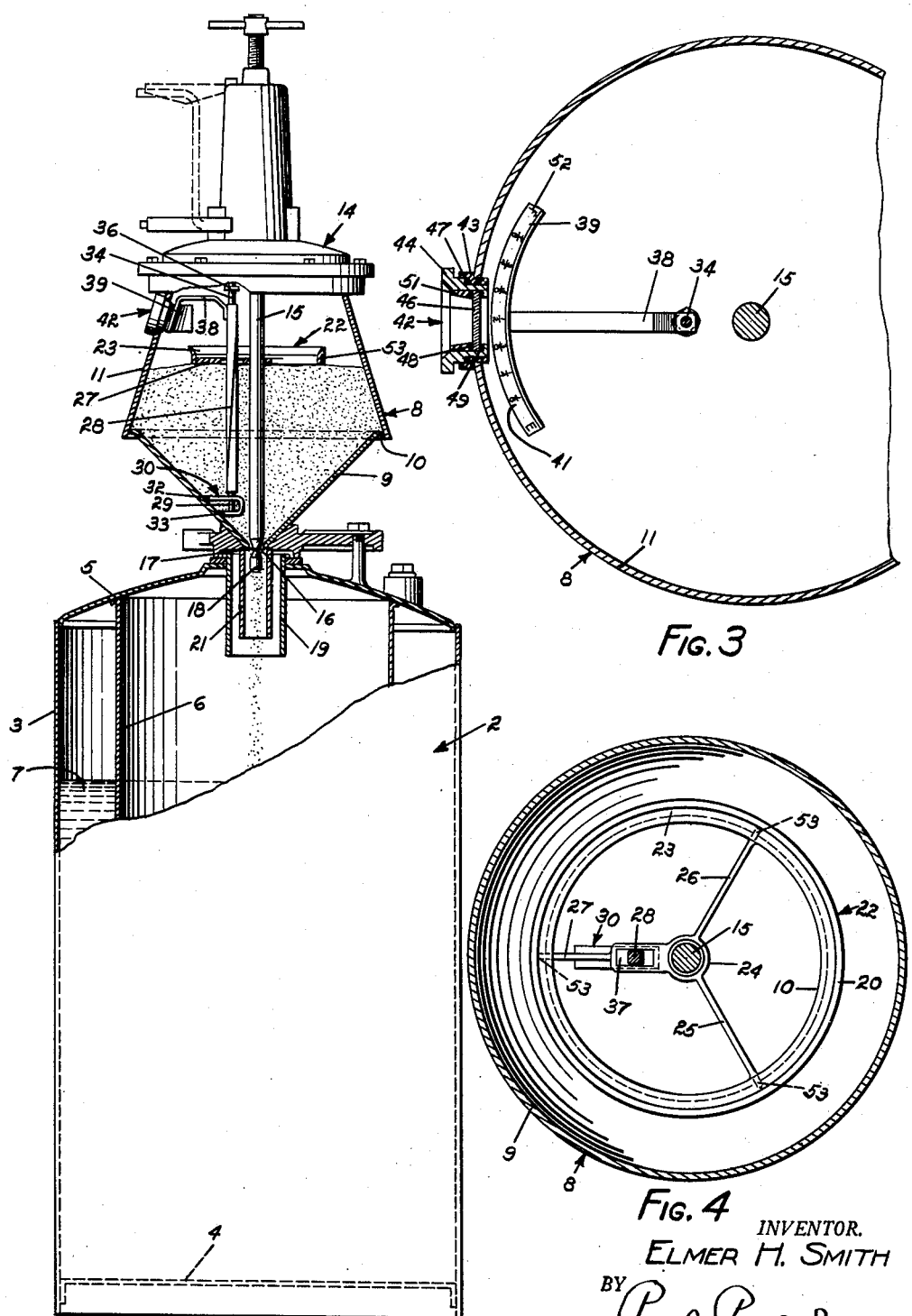
Figure 1 is an elevational view of a conventional commercial carbide generator having its upper portion partially broken away to illustrate the mounting of the carbide level indicator within the hopper, the hopper being shown well supplied with carbide.
Figure 3 is a cross-sectional view on the line 3—3 of Figure 2.
Figure 4 is a detail sectional view on the line 4—4 of Figure 2.

In the selected embodiment of the invention herein disclosed, there is illustrated in Figure 1, for purposes of disclosure, a conventional carbide generator comprising a main body portion 2 including a cylindrical wall 3, a bottom wall 4, and a top wall 5 which cooperate with one another to provide a water chamber. Secured to the upper wall 5 and depending therefrom is an inner shell 6, the lower end of which is sealed by the water 7 contained within the body 2.

A hopper, generally designated by the numeral 8, is detachably mounted on the top wall 5 of the generator in the usual manner, and is shown comprising two conical sections, a lower part 9 and an upper part 11, which are welded together at 10 to provide in effect an integral structure. The upper hopper section 11 is provided with an opening 12 which normally is closed by a diaphragm 13, secured to the hopper section 11 by a suitable member or bonnet 14, as will be understood by reference to Figure 2. A feed shaft 15 is secured to the diaphragm 13 and extends downwardly through the hopper with its lower end positioned in the discharge opening 16 provided at the bottom of the hopper. The feed shaft, it will be noted by reference to Figures 1 and 2, is formed at its lower end with a neck 17 which, when in the position shown in Figure 1, permits carbide to feed through the opening 16 into the water within the shell 6.

Figures 2, 5:
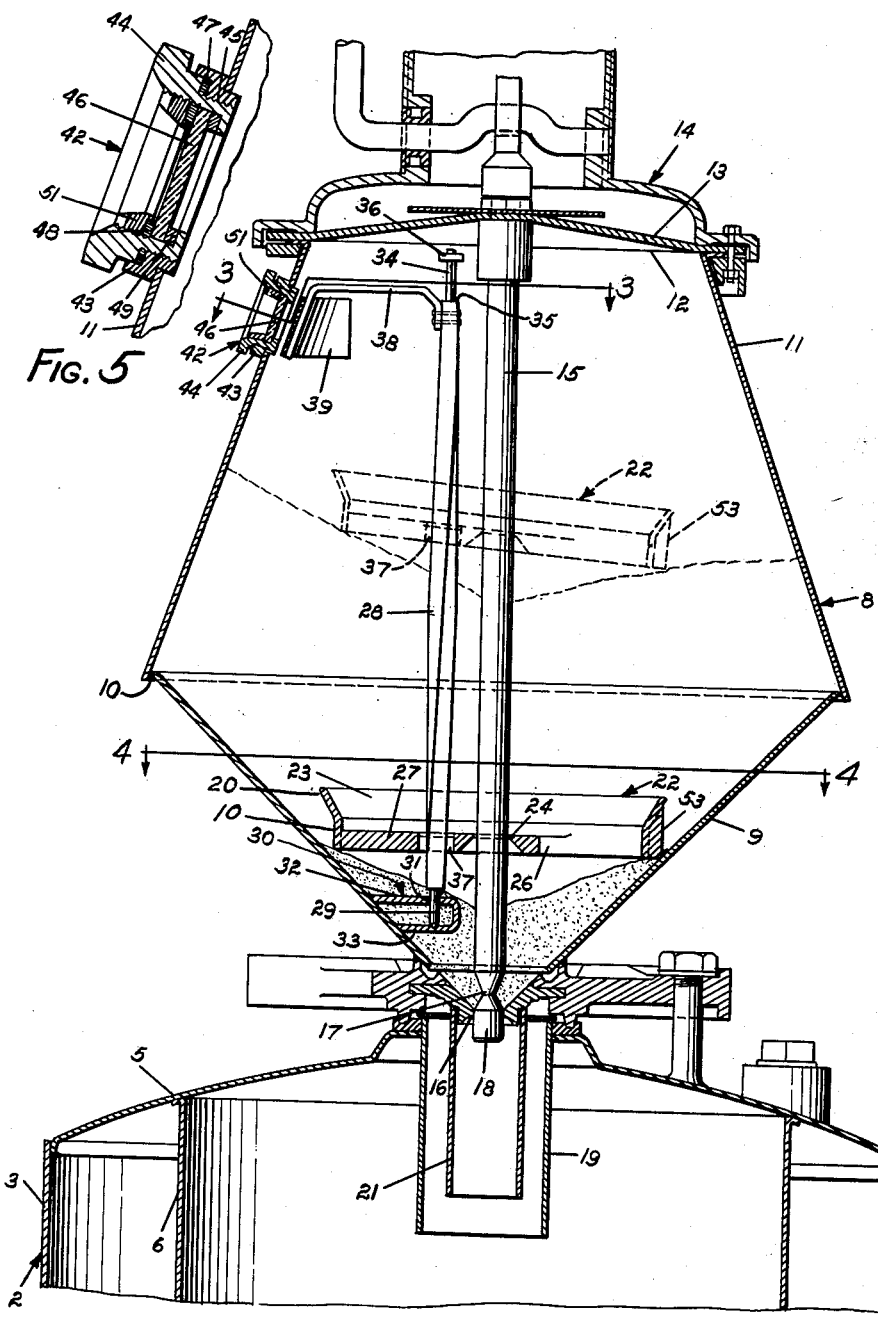
Figure 2 is an enlarged detail sectional view of the upper portion of the generator showing the position of the so-called "float" when the hopper is substantially empty of carbide.
Figure 5 is a detail sectional view showing the mounting of the window in the hopper wall.

When the gas pressure within the generator and hopper reaches a predetermined figure, the flow of carbide from the hopper will be interrupted as a result of the head 18 at the bottom of the operating shaft 15 being moved upwardly into the discharge opening 16 as a result of the diaphragm 13 being upwardly distorted, as shown in Figure 2. All of the above described mechanisms are well known in the art, and therefore need not be further discussed in the present application.

An important feature of the present invention resides in the means provided for visibly indicating from the exterior of the generator, the level of the carbide in the hopper 8. The walls of the hopper sections 9 and 11 are usually constructed of sheet metal and therefore are opaque whereby it is impossible to note from the exterior of the generator the level of the carbide within the hopper.

Carbide hoppers of the type disclosed in Figures 1 and 2 are filled with carbide by detaching the hopper 8 from the generator body 2, after which the hopper is inverted so that the splash tube assembly, including the splash tube 19 and its inner complemental tubular member 21, are upwardly directed. The parts 19 and 21 are then removed from the bottom of the hopper to uncover the opening 16 in the bottom of the hopper, whereupon a fresh supply of carbide may be introduced through the opening 16 into the hopper, after which the hopper is secured in position upon the generator body 2, as shown in Figures 1 and 2.

An important feature of the present invention resides in the provision of means for visibly indicating at all times the level of the carbide contained in the carbide hopper, whereby an attendant may always readily note how soon a generator may require a fresh supply of carbide.

To thus indicate the level of the carbide in the hopper, a member 22 is provided within the hopper and is shown comprising an annulus 23 and a centrally disposed hub 24. The hub 24 has an opening therein which slidably receives the feed shaft 15 and whereby the member 22 is guided in its up-and-down travel within the hopper by said shaft. The hub portion 24 is supported by a plurality of radial arms 25, 26 and 27, which may be integrally formed with the hub 24 and the annulus 23. The member 22 is preferably formed of cast aluminum, and acts as a "float," and for the sake of explanation, this member will hereinafter be referred to as a "float."

The annulus 23 of the float 22 comprises a lower cylindrical wall portion 10 and an upper outwardly flared conical wall portion 20, which are preferably made integral, as shown in Figure 2. This particular design and construction resulted after considerable experimental work in an attempt to develop a "float" which would always ride or float on top of the mass of carbide within the hopper, and would not sink into the carbide with the downward flow of the carbide at the center of the mass, because of the centrally located discharge opening in the bottom of the hopper.

The relatively thin outer wall portions 10 and 20 of the annulus 23 and particularly the outwardly flared portion 20 thereof, positively prevents the "float" from sinking into the carbide beyond a pre-determined depth, whereby the "float" will always remain on top of the carbide to thereby register an accurate reading of the level of the carbide within the hopper, as will subsequently be described.

A gauge operating rod or shaft 28 is disposed in spaced parallel relation to the feed shaft 15 and is preferably square in cross-section, as best shown in Figure 4. The rod or shaft 28 is twisted through an arc of approximately 90°, thereby to provide, in effect, a spiral shaft, the reasons for which will later be explained. The gauge shaft 28 is provided at its lower end with a reduced terminal 29, received in a guide opening 31 provided in a bracket 30 secured to the wall of the lower hopper section 9 by such means as welding.

The bracket 30 may be formed from a single strip of strap metal bent to form a U having its upper leg 32 made relatively longer than its bottom leg 33 so that when the bracket is secured to the conical wall of the lower hopper section 9, the legs 32 and 33 of the bracket will be substantially horizontally disposed. The lower end of the terminal 29 is preferably conical in formation and engages the top surface of the lower leg 33 of the bracket, whereby the weight of the gauge shaft 28 and the parts carried thereon will be supported on the tip of the terminal 29 to thereby reduce friction to a minimum.

The upper end of the rod or shaft 28 is shown provided with a similar reduced terminal 34 which preferably is relatively longer than the lower terminal 29 to downwardly space the shoulder 35 of the shaft 28 from a guide bearing 36 fixedly mounted in the upper portion of the hopper section 11 and in which the shaft terminal 34 is supported. By referring to Figure 2, it will be noted that the spacing between the shoulder 35 and the bottom of the bearing 36 is slightly greater than the total length of the lower terminal 29 whereby the spiral gauge shaft 28 may readily be removed from its bearings by first moving it upwardly to disengage the lower terminal 29 from the bracket 30, after which the shaft may be lowered to detach its upper terminal 34 from the bearing 36. This may readily be accomplished when the bonnet 14 and diaphragm 13 have been detached from the top of the hopper.

The gauge shaft 28 passes through a rectangular opening 37 provided in the arm 27 of the "float" 22, as best illustrated in Figure 4. The spacing between the side walls of the opening 37 is such as to freely receive the square gauge shaft 28, whereby when the "float" 22 gradually moves downwardly within the hopper as the level of the carbide drops because of the feeding of the carbide from the bottom of the hopper into the water chamber, rotary movement is imparted to the spiral shaft 28, as will readily be understood by reference to Figures 1, 2 and 4.

A laterally extending arm 38 is shown secured to the upper end of the spiral shaft 28 and may be provided at its outer end with an elongated segmental plate 39 having suitable indicia or indicating marks provided thereon, as indicated at 41. A window, generally designated by the numeral 42, is provided in the wall of the upper hopper section 11, and is shown comprising a bushing 43 having a reduced portion fitted within an opening in the wall of the hopper section 11 and welded thereto in leakproof relation. The bushing 43 is internally threaded to receive a plug or member 44 having a threaded portion 45 adapted to be received in threaded engagement with the bushing 43, as best illustrated in Figure 5. The member 44 carries a transparent plate 46 which serves as a window through which a portion of the indicia 41 on the segmental plate 39 may readily be noted, as will be understood by reference to Figures 2, 3 and 5. Leakage between the bushing 43 and member 44 is eliminated by the provision of a suitable gasket 47, and the transparent plate 46 is shown interposed between gaskets 48 and 49 and is secured in the member 44 by a suitable retaining ring 51.

When the hopper is filled with carbide, as hereinbefore explained, the "float" 22 drops by gravity to the lowermost portion of the interior of the hopper which, when in inverted position to receive a charge, will thus cause the "float" to assume a position adjacent to the diaphragm 13.

When the hopper has been adequately filled it is returned to its original upright position upon the generator body 2 and suitably secured thereto, as shown in Figures 1 and 2. The "float" 22 will then be supported on the top of the carbide within the hopper, as illustrated in Figure 1.

The opposed side walls of the elongated opening 37 in the arm 27 of the "float" 22 are so spaced apart as to prevent the spiral shaft 28 from relatively rotating in the hopper 8, when the "float" is at rest. However, because of the gauge shaft 28 being in the form of a spiral, when the "float" is moved up or down within the hopper relative to the spiral shaft 28, rotation will be imparted to said shaft to thereby cause the gauge plate 39 to move relatively to the window 46. Thus, when the "float" is in its uppermost position, the "F" or "Full" mark 52 of the gauge plate 39 will be in registration with the window 46 so that an attendant may readily note that the hopper is full.

Conversely, when the "float" reaches its lowermost position, shown in full lines in Figure 2, the "E" or "Empty" mark on the gauge plate 39 will be in registration with the window 46. The "float" 22 is so related to the window 46 and gauge plate 39 that when the "float" reaches its "Empty" position, as shown in full lines in Figure 2, the hopper will not have been completely emptied of carbide so that the generator may continue to operate for a limited time after the gauge shows "Empty."

The "float" 22 is preferably provided with a plurality of peripheral lugs 53 adapted to engage the conical wall of the lower hopper section 9, when the "float" is in its lowermost position, thereby to prevent direct contact of the lower edge of the annulus 23 with the hopper wall.

Should the inner surface of the glass or window 46 become covered with an accumulation of carbide dust, such dust may readily be removed from the glass by simple unscrewing the member 44 from the bushing 43 and wiping off the glass with a clean cloth. During this operation, gas in the upper portion of the hopper is released therefrom before the window is removed from its support.

The novel carbide level indicator herein disclosed has proven very efficient and accurate in actual use. The fact that the spiral shaft 28 passes downwardly through the body of the carbide does not appear to affect operation of the gauge, as the carbide does not pack so firmly around the shaft but that the shaft 28 may readily be rotated by downward movement of the "float" as the level of the carbide gradually drops.

The construction of the apparatus is very simple, and it is so designed that it may readily be applied to a conventional generator at very little expense. While I have herein illustrated the level indicating gauge as being used in connection with a carbide generator for indicating the level of the carbide in the generator hopper, it is to be understood that it may be used in connection with other apparatus where applicable without departing from the scope of the invention.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an acetylene generator comprising a hopper adapted to contain a supply of carbide and having a feed shaft therein for feeding carbide from the bottom of the hopper, and a wall of said hopper having a window therein, an annular metallic "float" within the hopper adapted to be supported on the top of the mass of carbide contained therein, said "float" having an outer annular wall composed of a lower cylindrical wall portion and an upper outwardly flared wall portion having a plurality of radially disposed arms cooperating to support a centrally located hub having a guide opening therein for receiving the feed shaft of the hopper, the unique construction of the outer annular wall of the float preventing the float from sinking into the carbide when the generator is in operation.

2. A carbide level indicator for acetylene generators comprising a carbide hopper having a feed opening at its bottom and a feed shaft extending upwardly through the hopper for feeding carbide therefrom, said indicator comprising an auxiliary upright shaft mounted for rotary movement in said hopper and disposed in spaced parallel relation to the feed shaft, a skeleton-like float member mounted for relative tilting movement on said spaced shafts whereby it may freely teeter relative to said shafts as a result of variations in the surface level of the mass of carbide within the hopper upon which it continually rests, said float member permitting the feed shaft to freely rotate relative thereto to feed carbide from the hopper, means providing a driving connection between the float member and the auxiliary shaft whereby relative up-and-down movement of the float member within the hopper will impart rotation to said auxiliary shaft, a window in the upper portion of the hopper wall, an arm secured to and extending laterally from said auxiliary shaft, an arcuately formed member secured to said arm adjacent to said window and carrying level indicating indicia which may readily be viewed through said window, said member being directly movable with said auxiliary shaft to constantly indicate the level of the carbide within the hopper, as the float member gradually descends within the hopper as a result of the surface level of the carbide within the hopper dropping because of carbide being fed therefrom during operation of the generator, and said float member comprising an outer annular wall composed of a cylindrical wall portion and an outwardly flared wall portion which cooperate to support the float member on the surface of the mass of carbide in the hopper.

3. A carbide level indicator for acetylene generators comprising a carbide hopper having a feed opening at its bottom and a feed shaft extending upwardly through the hopper for feeding carbide therefrom, said indicator comprising an auxiliary upright spiral shaft mounted for rotary movement in said hopper and disposed in spaced parallel relation to the feed shaft, said auxiliary shaft having diametrically opposed flat surfaces disposed in parallel relation to one another, a skeleton-like float member having an axially disposed conical bore for receiving the feed shaft and whereby the float member may freely teeter on said shaft as a result of variations in the level of the mass of carbide within the hopper upon which it continually rests, and said float member also having a rectangular aperture therein for loosely receiving said auxiliary shaft, said rectangular aperture having opposed parallel walls for engaging the opposed flat wall surfaces of said auxiliary shaft, whereby up-and-down movement of the float member within the hopper will impart relative rotation to said auxiliary shaft, means carried by the auxiliary shaft and cooperating with means in the upper portion of the hopper wall for continually indicating the level of the carbide within the hopper, when the generator is in use, and means for freely sustaining the float member upon the surface of the mass of carbide within the hopper to assure accurate functioning of the indicator.

ELMER H. SMITH.

References Cited in the file of this patent

UNITED STATES PATENTS

| Number | Name | Date |
|---|---|---|
| 531,106 | Echols | Dec. 18, 1894 |
| 775,544 | Rantz et al. | Nov. 22, 1904 |
| 1,119,545 | Shaw | Dec. 1, 1914 |
| 1,633,322 | Gregory | June 21, 1927 |
| 1,714,515 | Middelboe | May 28, 1929 |
| 2,344,564 | Schepman | Mar. 21, 1944 |
| 2,370,630 | Baker et al. | Mar. 6, 1945 |